(12) United States Patent
Coleou

(10) Patent No.: US 7,890,265 B2
(45) Date of Patent: Feb. 15, 2011

(54) METHOD FOR FILTERING SEISMIC DATA, PARTICULARLY BY KRIGING

(75) Inventor: Thierry Coleou, Paris (FR)

(73) Assignee: Cggveritas Services SA, Massy (FR)

( * ) Notice: Subject to any disclaimer, the term of this patent is extended or adjusted under 35 U.S.C. 154(b) by 85 days.

(21) Appl. No.: 10/501,370

(22) PCT Filed: Jan. 14, 2003

(86) PCT No.: PCT/FR03/00099
§ 371 (c)(1),
(2), (4) Date: Jul. 14, 2004

(87) PCT Pub. No.: WO03/058279
PCT Pub. Date: Jul. 17, 2003

(65) Prior Publication Data
US 2005/0209895 A1  Sep. 22, 2005

(30) Foreign Application Priority Data
Jan. 14, 2002  (FR) .................................. 02 00397

(51) Int. Cl.
*G01V 1/28* (2006.01)
*G01V 1/00* (2006.01)

(52) U.S. Cl. .......................................... 702/14; 367/73

(58) Field of Classification Search ................ 702/17, 702/14, 16, 1, 2, 5, 189, 190; 703/10, 2, 703/5; 367/37, 38, 43, 73; 705/5
See application file for complete search history.

(56) References Cited

U.S. PATENT DOCUMENTS

| | | | | |
|---|---|---|---|---|
| 5,321,613 A * | 6/1994 | Porter et al. | .................... | 702/1 |
| 5,995,906 A * | 11/1999 | Doyen et al. | .................. | 702/16 |
| 6,295,512 B1 * | 9/2001 | Bryant | ....................... | 702/189 |
| 6,597,992 B2 * | 7/2003 | Rooney et al. | ................. | 702/5 |
| 6,721,694 B1 * | 4/2004 | Lambrecht et al. | ............. | 703/2 |
| 6,959,245 B2 * | 10/2005 | Rooney et al. | ................. | 702/5 |
| 6,988,038 B2 * | 1/2006 | Trappe et al. | ................. | 702/17 |
| 2002/0019728 A1 * | 2/2002 | Van Bemmel et al. | .......... | 703/2 |

OTHER PUBLICATIONS

Goovaerts, P., Ordinary Cokriging Revisited, 1998, Mathematical Geology, vol. 30, No. 1, pp. 21-42.*
Mundim et al., Application of Seismic Attribute Filtering with Factorial Kriging to Estimate Porous Volume: A Case Study on a Brazilian East Coast Offshore Turbidity Reservoir, 2001, SPE 69481.*

(Continued)

*Primary Examiner*—Edward R Cosimano
*Assistant Examiner*—Toan M Le
(74) *Attorney, Agent, or Firm*—Fulbright & Jaworski, L.L.P.

(57) ABSTRACT

A method of filtering at least two series of seismic data representative of the same zone, the method including the step of determining an estimate of the component that is common to the data series, and the step of deducing from this estimate a resolution of the data series. The method is applicable to 4D seismic surveying.

10 Claims, 4 Drawing Sheets

OTHER PUBLICATIONS

Yao et al., Scale Matching with Factorial Kriging for Improved Porosity Estimation from Seismic Data, 1999, Mathematical Geology, vol. 31, No. 1, pp. 23-46.*

Sandjivy, L., Kriging Analysis of Geochemical Data [Analyse Krigeante de Donnees Geochimiques], 1984, Sciences de la Terre, Series Informatique Geologique 18.*

Kanevski et al., Mapping of Soil Contamination by Using Artificial Neural Networks and Multivariate Geostatistics, 1997, Springer Berlin/Heidelberg Publisher, vol. 1327, pp. 1125-1130.*

Xu et al., Integrating Seismic Data in Reservoir Modeling: The Collocated Cokriging Alternative, 1992, SPE 24742, pp. 833-842.*

Gringarten et al., Methodology for Variogram Interpretation and Modeling for Improved Reservoir Characterization, 1999, SPE 56654, pp. 1-13.*

Myers, D., Pseudo-Cross Variograms, Positive-Definiteness, and Cokriging, 1991, Mathematical Geology, vol. 23, No. 6, pp. 805-816.*

Mundim et al., Application of Seismic Attribute Filtering with Factorial Kriging to Estimate Porous Volume: A Case Study on a Brazilian East Coast Offshore Turbidite Reservoir, 2001, SPE 69481, pp. 1-9.*

Cassiani et al., "A Geostatistical Framework for Incorporating Seismic Tomography Auxiliary Data . . . ", Journal of Hydrology, vol. 206, No. 1-2, 1988, pp. 58-74.

Doyen, Philippe M., "Porosity From Seismic Data: A Geostatistical Approach", Geophysics: Socieity of Exploration Geophysicists, vol. 53, No. 10, Oct. 1988, pp. 1263-1275.

D'Agostino, et al., "Spatial and Temporal Study of Nitrate Concentration in Groundwater . . . ", Environmental Geology, vol. 36, No. 3-4, Dec. 1998, pp. 285-295.

Jimenez-Espinosa R. et al., "Identification of Geochemical Anomalies Using Principal Component . . . ", Journal of Geochemical Exploration, vol. 46, No. 3, 1993, pp. 245-256.

Beyer, et al., "Assessment of the Method Used to Construct Clearness Index Maps for the New European Solar . . . ", Solar Energy, vol. 61, No. 6, 1997, pp. 389-397.

Dousset, P., et al., "Analyse Krigeante des donnees . . . [Kriging Analysis of Multivariable Geochemical . . . ]", Sciences de la Terre, serie informatiue geologique 26, pp. 1-22, 1987.

Arnaud, M., et al., "L'Analyse Krigeante Pour le Classernent D'Observations . . . [Kriging Analysis for Classifying . . . ]", Revue de statistique appliquee, XLIX (2), pp. 45-67, 2001.

Sandjivy L., et al., "Analyse Krigeante Et Analyse Spectrale [Kriging Analysis and Spectral Analysis]", Sciences de la Terre, serie•informatique geologique 21, pp. 115-124, 1984.

Sandjivy L., "Analyse Krigeante De Donnees Geochimiues [Kriging Analysis of Geochilic Data-Study of..]", Sciences de la Terre, serie informatique geologique 18, pp. 143-172, 1984.

Jacquet, O., "L'Analyse Krigeante Appliquee Aux . . . [Kriging Analysis Applied to Oil..]", Bulletin de l' Assoc. Suisse des Geologues et Ingenieurs du Petrole, vol. 24, pp. 15-34, 1988.

Wackernagel, H., et al., "Gold Prospecting with Factorial Cokriging . . . ", Computers in Geneology: 25 years of Progress, Studies in Mathematical Geology 5, pp. 33-43, 1993.

Daly, C., "Application of Multivariate Kriging to the Processing of Noisy Images", Geostatistics, 1989, vol. 2, Kluwer Academic Publisher, M Armstrong (ed.), pp. 749-760, 1989.

Seguret, S., "Analyse Krigeante Spatio-Temporelle", Geostatics, 1993, vol. 3, May 25-26, Fontainebleau, pp. 115-138.

* cited by examiner

METHOD FOR FILTERING SEISMIC DATA, PARTICULARLY BY KRIGING

GENERAL TECHNICAL FIELD—BACKGROUND ON KRIGING ANALYSIS

The present invention relates to filtering seismic data, in particular by kriging analysis.

Kriging analysis enables a random function to be resolved from its covariance function.

In particular, it is conventionally used in geostatistics for filtering seismic data, particularly but in non-limiting manner, for characterizing reservoirs.

Kriging analysis relies in particular on the assumption that a phenomenon measured locally by means of optionally-regular sampling can be analyzed as a linear sum of a plurality of independent phenomena, the variogram of the overall phenomenon corresponding to the linear sum of the variograms of each of the independent phenomena making it up.

Conventionally, the variogram corresponding to the measured experimental data is resolved as sum of modeled variograms, and from the experimental data and the models selected for the individual variograms used to resolve the data, there are deduced the individual functions that make up the random function corresponding to the overall phenomenon.

It is thus possible to extract from a seismic data map of the type shown in FIG. 1 (e.g. raw experimental data) firstly the white noise that is present in the data (FIG. 2a), secondly noise corresponding to linear lines (FIG. 2b), and finally filtered data cleared of both of these kinds of noise (FIG. 2c).

The kriging calculations for determining the values of the individual functions into which an overall random function is resolved are themselves conventionally known to the person skilled in the art.

In this respect, reference can be made, for example, to articles and publications mentioned in the bibliography given at the end of the present description.

Very generally, the value of an individual function involved in making up the overall random function is determined as being a linear combination of experimental values for points in an immediate neighborhood of the point under consideration, these experimental values being given weighting coefficients.

In other words, if it is considered that a function $Z(x)$ is made up as the sum of individual functions $Y^u(x)$, this can be written:

$$Z(x) = \sum_{u=1}^{U} Y^u(x)$$

and the component $Y^u(x)$ is estimated by:

$$Y^{u*}(x) = \sum_{\alpha=1}^{N} \lambda_u^\alpha Z_\alpha$$

where $\alpha$ is a dummy index designating the points under consideration around the point $\underline{x}$ for which it is desired to determine the estimated value $Y^{u*}(x)$, $Z_x$ being the value at the point $\underline{x}$, N being the number of such points.

It can be shown that the weighting coefficients $\lambda\alpha$ satisfy the equation:

$$\begin{pmatrix} C_{11} & \cdots & C_{1N} \\ \vdots & & \vdots \\ C_{N1} & \cdots & C_{NN} \end{pmatrix} \begin{pmatrix} \lambda_u^1 \\ \vdots \\ \lambda_u^N \end{pmatrix} = \begin{pmatrix} C_{01}^u \\ \vdots \\ C_{0N}^u \end{pmatrix}$$

where the index 0 designates the point for which an estimate is to be determined, the values $C_{01}^u$ to $C_{0N}^u$ being the covariance values calculated from the model $\underline{u}$ corresponding to the component $Y^u$ (values of the covariance function for the distances between each data point and the point to be estimated), the values $C_{ij}$ being covariance values calculated as a function of the selected model for the variogram of the function to be estimated (values of the covariance function for the distances between the data points).

These weighting coefficients $\lambda_u^x$ are thus determined merely by inverting the covariance matrices.

PROBLEMS POSED BY THE STATE OF THE ART—SUMMARY OF THE INVENTION

One of the difficulties of presently-known kriging analysis techniques is that they require the use of models of the covariance functions.

The advantage of using such models is that they make it possible to have matrices which are defined, positive, and invertible.

Nevertheless, it will be understood that although such filtering techniques give good results, they are strongly dependent on the individual expertise of the person selecting the models for the various variograms.

That can be a source of error, and prevents those techniques being used by people who are not specialists.

Furthermore, selecting models also leads to significant losses of time in production.

An object of the invention is to mitigate that drawback and to propose a filtering technique using kriging analysis that can be implemented in automatic or almost automatic manner.

The invention provides a method of filtering at least two series of seismic data representative of the same zone, by determining (e.g. by determining the cross variogram of the data series and solving the co-kriging equation) an estimate of the component that is common to the data series, and deducing a resolution of these data series is deduced from the estimate.

The invention also provides a method of processing seismic data in which a filter method of the above-specified type is implemented in order to compare two series of seismic data corresponding, for the same zone, to grids of at least one common attribute obtained for two distinct values of at least one given parameter.

The invention also provides a method of filtering at least one series of data representative of the values of at least one physical parameter over at least one zone, characterized by identifying a model of a component of three-dimensional variability of its variogram, subtracting said model from the experimental variogram, and solving the kriging equation corresponding to the different variograms in order to deduce an estimate of the corresponding variability component on the data series.

BRIEF DESCRIPTION OF THE FIGURES

Other characteristics and advantages of the invention appear further from the following description which is purely illustrative and non-limiting and should be read with reference to the accompanying drawings, in which.

DESCRIPTION OF ONE OR MORE IMPLEMENTATIONS OF THE INVENTION

Automatic Filtering

It is assumed that two maps are available that have been obtained for the zone with seismic data acquired, for example, at different instants or for seismic attributes that are different.

Figure 1:
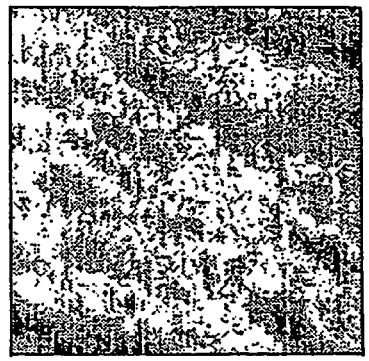
FIGS. 1 and 2a, 2b, and 2c, described above, illustrate an example of seismic data mapping and of the corresponding resolution by kriging analysis.
Figure 2A:
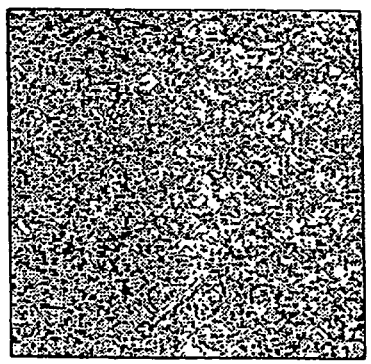
Figure 2B:
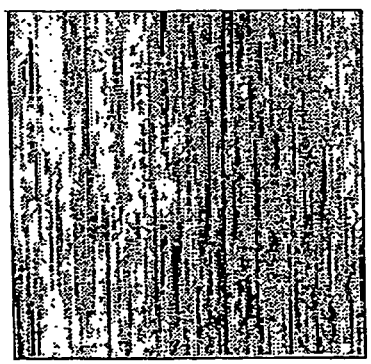
Figure 2C:
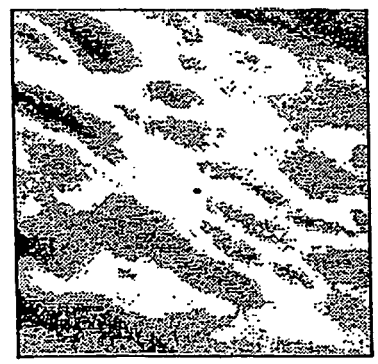
Figure 3A:
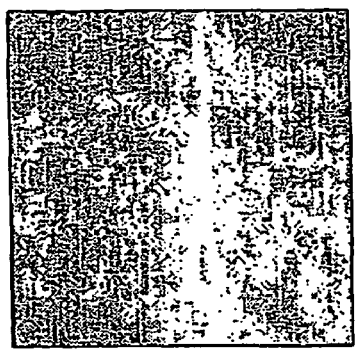
FIGS. 3a and 3b show two maps of the same zone, obtained from acquisitions undertaken at two different times.
Figure 3B:
Figure 5A:
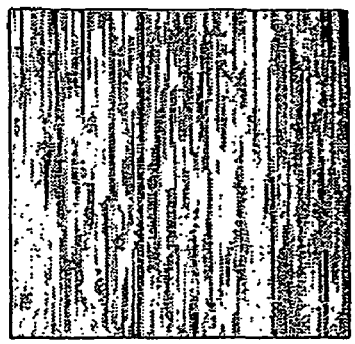
FIGS. 5a and 5b and FIGS. 6a and 6b are maps of components other than the component that is common to the maps of FIGS. 3a and 3b.
Figure 6A:
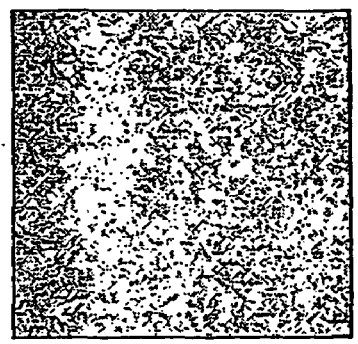
Figure 5B:
Figure 6B:
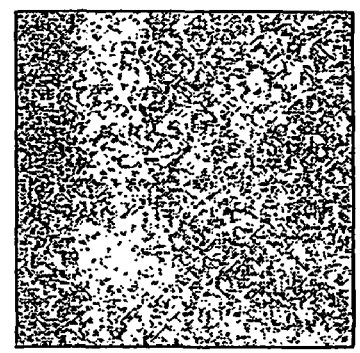

By way of example, these two maps are of the type shown in FIGS. 3a and 3b.

The two functions corresponding to these two data series are written Z1 and Z2 below.

It is proposed to resolve each of these two functions into the sum of their common component plus orthogonal residues.

For this purpose, there is determined, from two data series for which a cross variogram is available having the following values:

$$\gamma_{12}(h) = \frac{1}{N} \sum (Z1(x) - Z1(x+h))(Z2(x) - Z2(x+h))$$

where $\underline{x}$ and x+h designate the pairs of points taken into consideration in the direction and for the distance $\underline{h}$ for which the value of the variogram is determined, and where N is the number of pairs of points for said direction and said distance.

Knowing this cross variogram, an estimate is then determined of the function corresponding thereto, which satisfies:

$$Z_{12}^*(x) = \sum_{\alpha=1}^{N} \lambda_\alpha^1 Z_\alpha^1 + \sum_{\beta=1}^{N} \lambda_\beta^2 Z_\beta^2$$

where $\alpha$ and $\beta$ are two dummy indices designating the points taken into consideration around the point $\underline{x}$ for which it is desired to determine an estimate of said function, $Z_\alpha^1$ and $Z_\beta^2$ being the value at said point $\underline{x}$, N being the number of said points, and where $\lambda_\alpha^1$ and $\lambda_\beta^2$ are weighting coefficients.

These weighting coefficients $\lambda_\alpha^1$ and $\lambda_\beta^2$ are determined by inverting the co-kriging equation:

$$\begin{bmatrix} C_{11}11 & \ldots & C_{11}N1 & C_{11}11 & \ldots & C_{11}11 \\ \ldots & \ldots & \ldots & \ldots & \ldots & \ldots \\ C_{11}1N & \ldots & C_{11}NN & C_{12}11 & \ldots & C_{12}NN \\ C_{21}11 & \ldots & C_{21}N1 & C_{22}11 & \ldots & C_{22}N1 \\ \ldots & \ldots & \ldots & \ldots & \ldots & \ldots \\ C_{21}1N & \ldots & C_{21}NN & C_{22}11 & \ldots & C_{22}NN \end{bmatrix} \begin{bmatrix} \lambda_{11} \\ \ldots \\ \lambda_{1N} \\ \lambda_{21} \\ \ldots \\ \lambda_{2N} \end{bmatrix} = \begin{bmatrix} C_{11}1X \\ \ldots \\ C_{11}NX \\ C_{12}1X \\ \ldots \\ C_{12}NX \end{bmatrix}$$

where the coefficients $C12\alpha\beta$ and $C21\alpha\beta$ are the cross-variance values of the functions Z1 and Z2 at the points corresponding to indices $\alpha$ and $\beta$, and where the coefficients $C11\alpha\beta$ and $C22\alpha\beta$ are the covariance values respectively of the function Z1 and of the function Z2 at said points. The index X corresponds to the point referred to above as $\underline{x}$.

It should be observed that the matrix which appears in this equation has the advantage of being invertible under certain calculation conditions.

In this way, using experimental covariances, the two variables corresponding to the two initial data series are resolved automatically into a common component and into two residual orthogonal components. The regularity of the data means that the experimental covariance is known for all of the distances used, so no interpolation is needed, so the matrix is defined positive.

The function then obtained is an estimate of the component that is common to both data series.

Figure 4:
FIG. 4 is a map of the component that is common to the maps of FIGS. 3a and 3b.

FIG. 4 shows an estimate of the common component obtained from the data corresponding to the maps of FIGS. 3a and 3b.

It will be understood that it is particularly advantageous in numerous applications, and in particular in 4D seismic surveying, to have this common component available.

It serves in particular to eliminate non-repeatable acquisition artifacts:

on the basis of seismic attribute grids, and in particular, for example, on the basis of root mean square (rms) amplitudes in an interval;

on the basis of seismic time grids, and for example on the basis of seismic event times; and on the basis of seismic velocity volumes, and for example on the basis of automatically-determined points of origin for velocity vectors.

It may also be used in simple seismic surveying to eliminate non-repeatable acquisition artifacts:

in particular on the basis of seismic attribute grids calculated on consecutive incidence classes, or indeed on the basis of seismic attribute grids calculated on volumes obtained by partial summing or converted waves.

Furthermore, once an estimate has been determined for the common component, it is possible to determine the residual components corresponding to the difference between the initial data and said estimated common component.

These residual components can themselves be resolved by kriging analysis.

This is shown in FIGS. 5a, 5b and 6a, 6b which are maps of white noise and of linear line noise estimated in this way for each of the two series of measurements shown in FIGS. 3a and 3b.

Figure 7A:
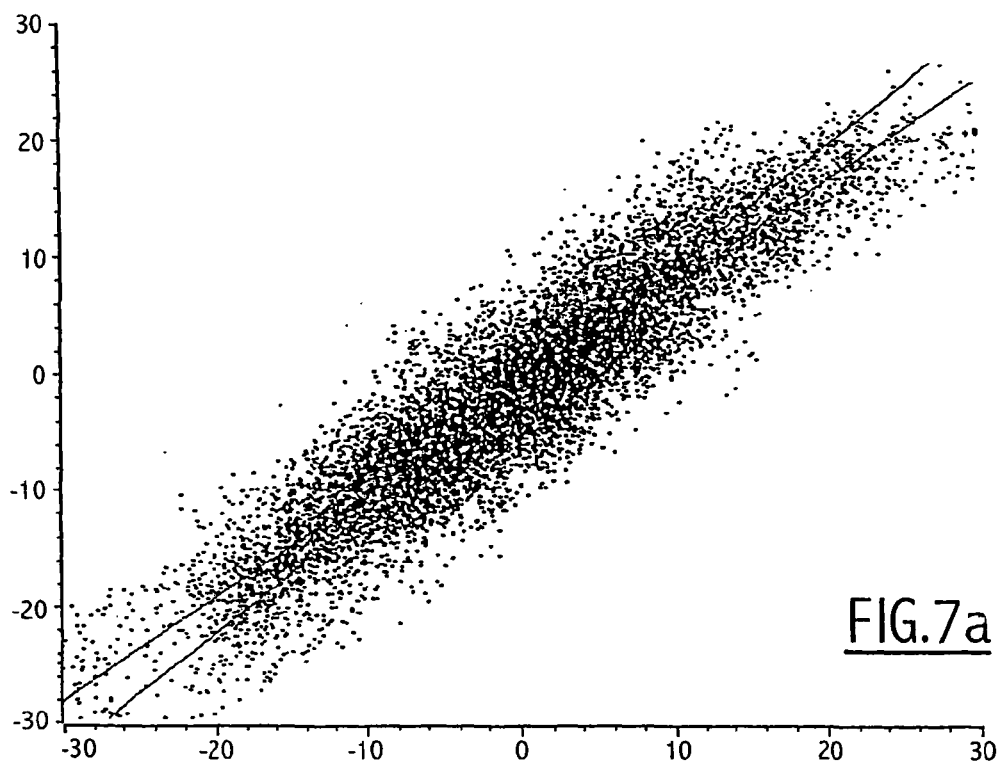
FIGS. 7a to 7c are graphs showing the distribution of errors respectively when using standard filtering, filtering by conventional factorial kriging, and filtering as proposed by the invention (factorial co-kriging).
Figure 7B:
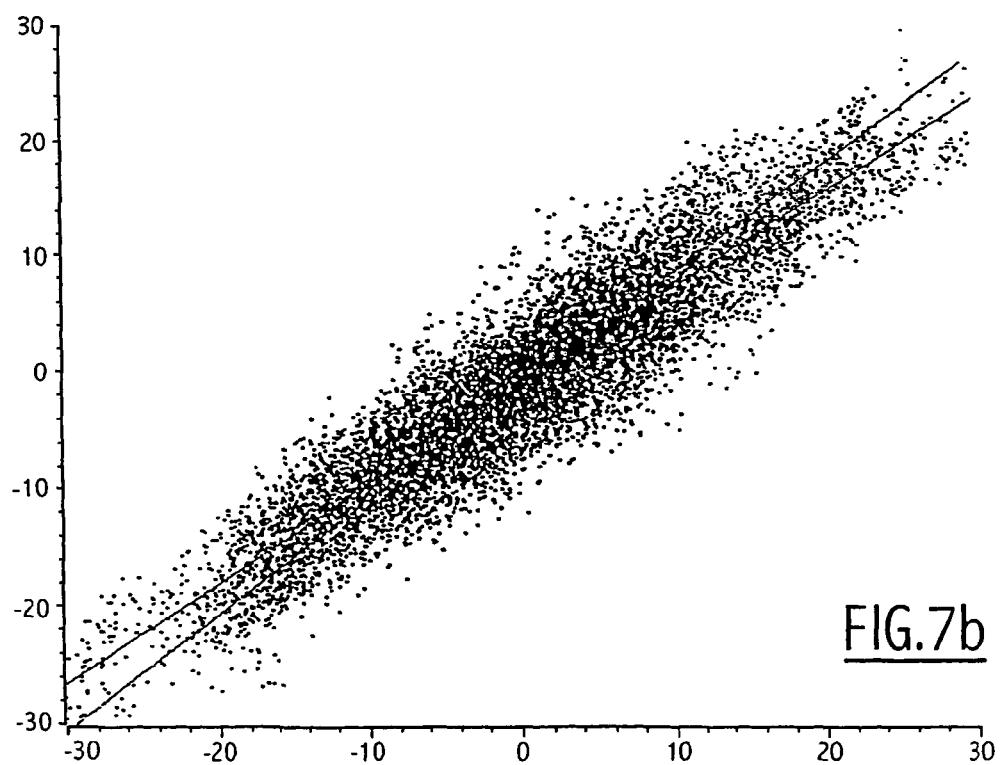
Figure 7C:
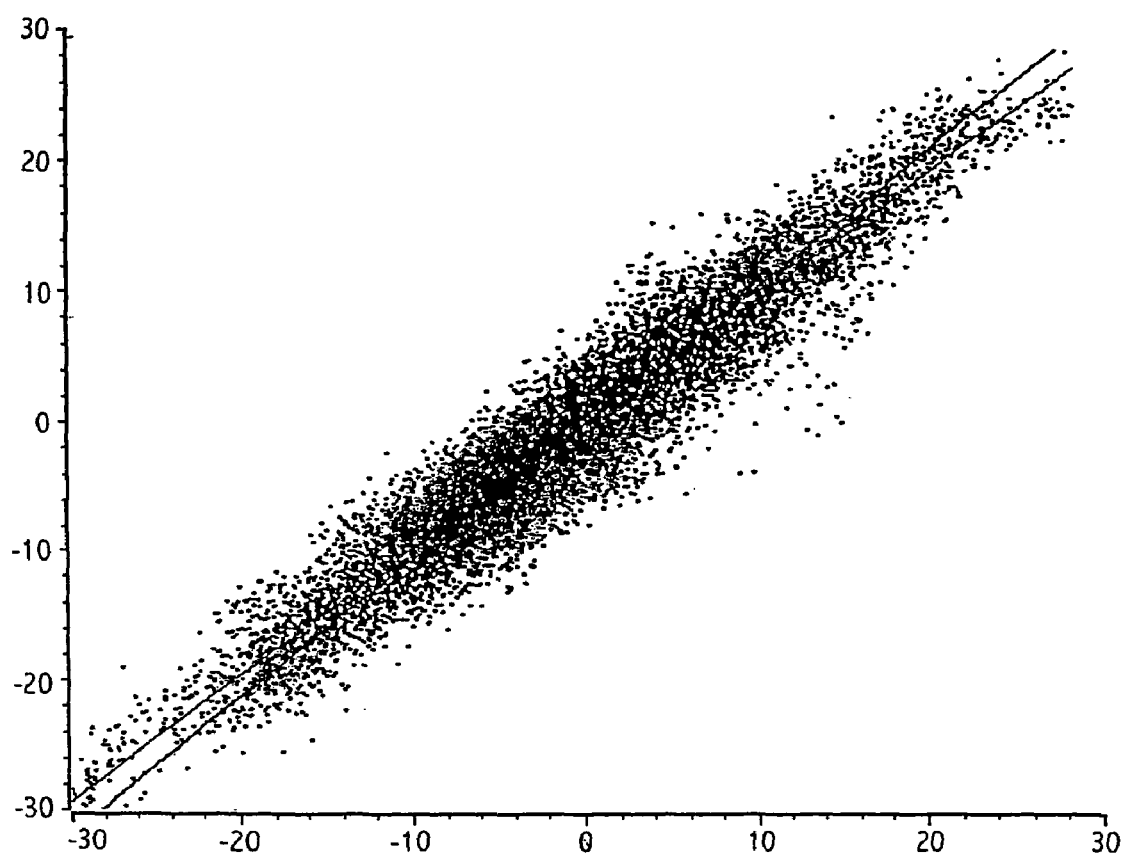

Examples of error measurements as obtained by standard filtering, by kriging analysis filtering, and by co-kriging analysis filtering (or multivariable kriging), are illustrated by the graphs of FIGS. 7a to 7c.

On reading these figures, it will be understood that filtering by co-kriging analysis makes it possible to obtain dispersions that are much smaller than those obtained with conventional filtering or filtering by kriging analysis, and gives better results.

The above description relates to an implementation using two series of data.

As will be readily understood, the proposed method can also be implemented in the same manner with a larger number of data series (campaigns).

Semi-Automatic Filtering

This second implementation also enables simplified resolving when only one seismic data series is available (function S1).

It assumes that a model of a component $\theta m$ of the experimental variogram $\theta$ is previously available.

This model which is known beforehand is, for example, the model of an independent component of the subsoil geology: white noise, stripes, etc.

Knowing this model of the component $\theta m$, there is deduced therefrom the residual variogram corresponding to the difference between the experimental variogram and this component $\theta m$.

Kriging analysis is then performed in order to determine firstly the model component Sm and secondly, on the basis of the residual variogram, the orthogonal residue R1 such that:

$$S1 = Sm + R1$$

This automatic resolution enables acquisition anomalies to be filtered out when they present three-dimensional coherence that is easily identified and modeled, such as the stripes parallel to the cables that are observed in the amplitudes and times when performing offshore seismic surveys.

REFERENCES

G. Matheron (1982), "*Pour une analyse krigeante des données régionalisées*" [For kriging analysis of regionalized data], Internal note, Center for Mathematical Morphology and Geostatiistics, Ecole Nationale Supérieure des Mines, Paris.

L. Sandjivy (1984), "*Analyse krigeante des données géochiliques—Etude d'un cas monovariable dans le domaine stationnaire*" [Kriging analysis of geochilic data Study of a single variable case in the steady domain], Sciences de la Terre, série informatique géologique 18, pp. 143-172.

A. Galli, L. Sandjivy (1984), "*Analyse krigeante et analyse spectrale*" [Kriging analysis and spectral analysis], Sciences de la Terre, série informatique géologique 21, pp. 115-124.

P. Dousset, L. Sandjivy (1987), "*Analyse krigeante des données géochimiques multivariables prélevées sur un site stannifère en Malaisie*" [Kriging analysis of multivariable geochemical data taken from a tin-bearing site in Malaysia], Sciences de la Terre, série informatique géologique 26, pp. 1-22.

L. Sandjivy (1987), "*Analyse krigeante des données de prospection géochimique*" [Kriging analysis of geochemical prospection data], Ph.D. thesis, engineer in mining techniques and sciences, ENSMP, 166 p.

O. Jacquet (1988), "*L'analyse krigeante appliquée aux données pétrolières*" [Kriging analysis applied to oil prospecting data], Bulletin de l'Assoc. Suisse des Géologues et Ingénieurs du Pétrole, Vol. 24, pp. 15-34.

C. Daly (1989), "Application of multivariate kriging to the processing of noisy images", Geostatistics, Vol. 2, Kluwer Academic Publisher, M. Armstrong (ed.), pp. 749-760.

C. Daly (1991), "*Applications de la géostatistique à quelques problèmes de filtrage*" [Applications of geostatistics to some filtering problems], Ph.D. thesis, engineer in mining techniques and sciences, ENSMP, 235 p.

H. Wackernagel, H. Sanguinetti (1993), "Gold prospecting with factorial kriging in Limousin, France", Computers in Geology: 25 years of progress, Davis & Herzfeld (ed.), Oxford, O.U.P., Studies in Mathematical Geology 5, pp. 33-43.

S. Seguret (1993), "*Analyse krigeante spatio-temporelle appliquée à des données aéromagnétiques*" [Spatio-temporal kriging analysis applied to aeromagnetic data], Cahiers de Géostatistique, Fasc. 3, ENSMP, pp. 115-138.

H. Wackernagel (1998), "Multivariate geostatistics: an introduction with applications", 2nd ed. Berlin, Springer, 291 p.

M. Arnaud et al., (2001), "*L'analyse krigeante pour le classement d'observations spatiales et multivariées*" [Kriging analysis for classifying three-dimensional and multivariate observations], Revue de statistique appliquée, XLIX (2), pp. 45-67.

The invention claimed is:

1. A method of filtering at least two series of seismic data representative of the same subsurface zone, the method being characterized by
    determining a cross variogram of these data series and
    solving a co-kriging equation which results from this determination for automatically deducing an estimate of the component that is common to the data series,
    wherein each of the data series is resolved into the sum of said common component and its respective orthogonal residues, said resolution of the data series used for determining the topography of the subsurface zone.

2. A method according to claim 1, characterized by determining the orthogonal residues for the various data series by subtracting the estimated common component from each of the data series.

3. A method according to claim 2, characterized by implementing kriging analysis to resolve said orthogonal residues.

4. A method of processing seismic data, comprising:
    comparing two series of seismic data corresponding, for the same zone, to grids of at least one common attribute obtained at two distinct values of at least one given parameter, said comparing including filtering at least two series of data representative of the same subsurface zone by determining a cross variogram of these data series and solving a co-kriging equation which results from this determination for automatically deducing an estimate of the component that is common to the data series,
    wherein each of the data series is resolved into the sum of said common component and its respective orthogonal residues, said common component of the data series used for determining the topography of the subsurface zone.

5. A method according to claim 4, characterized by
    determining the orthogonal residues for the various data series by subtracting the estimated common component from each of the data series.

6. A method according to claim 5, characterized by implementing kriging analysis to resolve said orthogonal residues.

7. A method of filtering at least one series of seismic data representative of at least one subsurface zone, the method being characterized by
    identifying a model of a component of three-dimensional variability of its variogram,
    subtracting said model from the experimental variogram, and solving the kriging equation corresponding to the different variograms in order to deduce an estimate of the corresponding variability component of the data series, wherein said estimate is used for determining the topography of the subsurface zone.

8. A method processing seismic data, comprising:

comparing two series of seismic data corresponding, for the same subsurface zone, to grids of at least one common attribute obtained at two different instants, said comparing including filtering at least two series of seismic data representative of the same subsurface zone by determining a cross variogram of these data series and solving a co-kriging equation which results from this determination for automatically deducing an estimate of the component that is common to the data series, wherein each of the data series is resolved into the sum of said common component and its respective orthogonal residues, said common component of the data series used for determining the topography of the subsurface zone.

9. A method according to claim 8, characterized by determining the orthogonal residues for the various data series by subtracting the estimated common component from each of the data series.

10. A method according to claim 9, characterized by implementing kriging analysis to resolve said orthogonal residues.

* * * * *